(12) United States Patent
Magnin et al.

(10) Patent No.: US 7,976,947 B2
(45) Date of Patent: Jul. 12, 2011

(54) ARTICLE OF MANUFACTURE COMPRISING SURFACES OF THERMOPLASTIC COMPOSITES COATED WITH A POWDER COATING COMPOSITION

(75) Inventors: Olivier Magnin, Lausanne (CH); Ludovic Granjou, Vevey (CH)

(73) Assignee: Dupont Polymer Powders Switzerland Sarl

( * ) Notice: Subject to any disclaimer, the term of this patent is extended or adjusted under 35 U.S.C. 154(b) by 751 days.

(21) Appl. No.: 11/500,699

(22) Filed: Aug. 8, 2006

(65) Prior Publication Data
US 2007/0036969 A1    Feb. 15, 2007

Related U.S. Application Data

(60) Provisional application No. 60/707,091, filed on Aug. 10, 2005.

(51) Int. Cl.
*B32B 27/00* (2006.01)
(52) U.S. Cl. ........ 428/394; 428/325; 428/327; 428/373; 428/374; 428/375
(58) Field of Classification Search .................. 523/400, 523/427; 524/502, 506, 517, 524; 525/208, 525/222; 428/325, 327, 373, 374, 375, 394
See application file for complete search history.

(56) References Cited

U.S. PATENT DOCUMENTS

| | | | |
|---|---|---|---|
| 4,046,728 A | 9/1977 | Harmuth | |
| 4,104,453 A | 8/1978 | Broering et al. | |
| 4,200,601 A * | 4/1980 | McClain | 264/9 |
| 4,237,037 A * | 12/1980 | Takahashi | 524/277 |
| 4,563,392 A * | 1/1986 | Harpell et al. | 428/394 |
| 5,091,454 A | 2/1992 | Arendt | |
| 5,366,251 A | 11/1994 | Brandt et al. | |
| 5,458,714 A | 10/1995 | Brandt et al. | |
| 5,470,912 A * | 11/1995 | Loar | 525/58 |
| 5,650,028 A | 7/1997 | Brandt et al. | |
| 5,686,188 A | 11/1997 | Brandt et al. | |
| 5,997,960 A | 12/1999 | Brandt et al. | |
| 6,544,596 B2 * | 4/2003 | Clemens et al. | 427/407.1 |
| 6,607,800 B1 | 8/2003 | Brandt et al. | |
| 6,706,805 B2 * | 3/2004 | Weitzel | 524/563 |

FOREIGN PATENT DOCUMENTS

| | | |
|---|---|---|
| DE | 19706619 A1 | 5/1998 |
| EP | 679447 A1 | 5/1998 |
| JP | 60208334 A | 10/1985 |
| WO | WO 90/05031 A1 | 5/1990 |
| WO | WO 90/05088 A1 | 5/1990 |

OTHER PUBLICATIONS

PCT International Search Report and the Written Opinion of the International Searching Authority, No. PCT/US2006/031137, mailed Dec. 14, 2006.

* cited by examiner

*Primary Examiner* — David Wu
*Assistant Examiner* — Marie Reddick

(57) ABSTRACT

A powder coating composition for coating on thermoplastic composites comprising an intimate mixture comprising:
  A) 50 to 99 wt % of at least one ethylene vinyl acetate copolymer with a vinyl acetate content in the range of 10 to 30 wt %,
  B) 1 to 50 wt % of at least one thermoplastic and/or thermosetting binder resin, and
  C) 0 to 20 wt % of at least one pigment and/or filler,
wherein the wt % amounts are based on the total weight of the powder coating composition A) to C); and the powder coating composition has excellent adhesion to the thermoplastic composite and enhanced impact resistance.

5 Claims, No Drawings

ARTICLE OF MANUFACTURE COMPRISING SURFACES OF THERMOPLASTIC COMPOSITES COATED WITH A POWDER COATING COMPOSITION

CROSS-REFERENCE TO RELATED APPLICATION

This application claims priority under 35 U.S.C. §119 from U.S. Provisional Application Ser. No. 60/707,091, filed Aug. 10, 2005, which is hereby incorporated by reference in its entirety

FIELD OF THE INVENTION

The invention is directed to a powder coating composition for coating surfaces of thermoplastic composites substrates that has excellent adhesion to the substrates as well as enhanced impact resistance.

DESCRIPTION OF PRIOR ART

More and more thermoplastic composites are used to replace metal parts, such as, containers, bottles, pipes and automotive parts for weight saving while maintaining mechanical performance. Thermoplastic composites are made, for example, from commingled roving composed of thermoplastic fibers, such as, polyolefine fibers and, possibly, also glass fiber material. Those rovings are easily converted into thermoplastic composites following various processes, such as, filament winding, moulding, diaphragm forming and panel lamination. Such thermoplastic composites should be coated by a suitable coating composition.

The coating of polyolefine substrate surfaces are well-known. Such coating compositions may contain polyolefines or chlorinated polyolefines to provide a sufficient adhesion of the coating to the surface, see, e.g., EP-A 679 447. DE-A 197 06 619 discloses UV (ultraviolet irradiation) curable coating compositions based on, e.g., (meth)acryl acid esters, unsaturated polyesters, epoxides or unsaturated polyurethanes providing scratch resistant coatings with good adhesive properties on plastic substrates, such as, thermoplastic flat panels.

Glass substrates may be coated by various compositions, often in a form of a protective or decorative coating, described, e.g., in WO 90/05031 and WO 90/05088, wherein the coating compositions are solvent-borne UV curable compositions based on acryl resins.

The use of ethylene-vinyl acetate copolymers as resins in coating compositions is well-known, in general, to increase flexibility and adhesion of the coatings, as well as, to provide an impermeability to water vapour and gases. They are specifically used, for example, as wire insulation.

In view of the thermoplastic composites based on thermoplastic fibers the types of solvent- and water-borne coating compositions, as well as, thermosetting powder coating compositions based on polyester based-powders and thermoplastic powders are not successful with regard to water imperme- ability and adhesion of the coatings. Furthermore, there is a need to provide coatings with a high smoothness, that completely cover abrasive fibers of the composite substrates and have enhanced impact resistance when applied to such substrates.

SUMMARY OF THE INVENTION

The present invention provides a powder coating composition for coating onto thermoplastic composites consisting of thermoplastic fiber material comprising an intimate mixture comprising:

A) 50 to 99 wt % of at least one ethylene-vinyl acetate copolymer with a vinyl acetate content in the range of 10 to 30 wt %,
B) 1 to 50 wt % of at least one thermoplastic and/or thermosetting binder resin, and
C) 0 to 20 wt % of at least one pigment and/or filler,
the wt % amounts are based on the total weight of the powder coating composition A) to C).

The powder coating composition according to the invention is a low bake powder coating, and has excellent adhesion to the thermoplastic composite. Especially, it shows an improved covering of abrasive glass fibers by coating thermoplastic composites made from a mixture of thermoplastic fibers and glass fiber material, and finally, it provides enhanced impact resistance.

The powder coating composition according to the invention is especially suitable for the use as a pigmented or unpigmented coating composition for thermoplastic substrates based on a composite of glass and thermoplastic fibers. The powder coating composition according to the invention provides a thermoplastic composite coated with a thermoplastic powder coating composition of the invention that is completely recyclable.

DETAILED DESCRIPTION OF THE INVENTION

The features and advantages of the present invention will be more readily understood, by those of ordinary skill in the art, from reading the following detailed description. It is to be appreciated those certain features of the invention, which are, for clarity, described above and below in the context of separate embodiments, may also be provided in combination in a single embodiment. Conversely, various features of the invention that are, for brevity, described in the context of a single embodiment, may also be provided separately or in any sub-combination. In addition, references in the singular may also include the plural (for example, "a" and "an" may refer to one, or one or more) unless the context specifically states otherwise.

The use of numerical values in the various ranges specified in this application, unless expressly indicated otherwise, are stated as approximations as though the minimum and maximum values within the stated ranges were both preceded by the word "about." In this manner, slight variations above and below the stated ranges can be used to achieve substantially the same results as values within the ranges. Also, the disclosure of these ranges is intended as a continuous range including every value between the minimum and maximum values.

All patents, patent applications and publications referred to herein are incorporated by reference in their entirety.

The powder coating composition according to the invention comprising preferably

A) 80 to 99 wt % of at least one ethylene-vinyl acetate copolymer with a vinyl acetate content in the range of 10 to 30 wt %,
B) 1 to 20 wt % of at least one thermoplastic and/or thermosetting binder resin,
C) 0 to 10 wt % of at least one pigment and/or filler,
D) 0.1 to 10 wt % of at least one additive conventionally used in coating technology, and
E) 0 to 40 wt % of at least one adhesion promoter additive.

All of the above wt % amounts are based on the total weight of the powder coating composition A) to E) according to the invention.

Suitable ethylene-vinyl acetate copolymers of component A) are copolymers which contain vinyl acetate monomers in the range of 10 to 30 wt %. The preferred content of vinyl acetate in the copolymer is in the range of 15 to 25 wt %, especially preferred, in the range of 16 to 20 wt %. The copolymers of component A) have a melt flow index (MFI) in the range of 50 to 300 g/10 min, preferred, in the range of 100 to 200 g/10 min, especially preferred, in a range of 120 to 180 g/10 min, according to the test method ASTM D 1238-ISO 1133. The MFI is an indication of the viscosity of the melt polymer and its ability to form an even coating.

The copolymers of component A) may also be used as a mixture of copolymers having a different content of vinyl acetate monomers and/or a different MFI.

The copolymers of component A) may be produced in a conventional manner by reacting of ethylene monomers with vinyl acetate monomers.

The thermoplastic powder coating composition of this invention may contain as component B) thermoplastic and/or thermosetting resins.

Examples for thermoplastic resins are polyolefine resins, such as, polyethylene and polypropylene, as well as, polyacrylate resins, polyamide resins.

Thermosetting resins, may be, for example, epoxy, polyester, (meth)acrylic, silanes and/or urethane resins which are well-known in the powder coating. Mixtures of carboxyl and hydroxyl group containing unsaturated polyesters may be used. Examples of suitable epoxy resins are unsaturated epoxies, such as, e.g., reaction products prepared from epichlorohydrin with bisphenol, for example, bisphenol A; functionalized resins, such as, acrylated epoxies. Suitable (meth)acrylic resins are unsaturated resins, such as, e.g., copolymers prepared from alkyl(methacrylates with glycidyl (meth)acrylates and olefinic monomers; functionalized resins, such as, polyester acrylics, epoxy acrylics, urethane acrylates. Suitable urethane resins are, e.g., unsaturated polyester urethanes, (meth)acrylic urethanes. The term (Meth)acrylate is respectively intended to mean acrylic and/or methacrylic. Crystalline and/or semicrystalline resins are also usable which have a melting temperature (Tm) in the range of e.g. 50 to 120° C.

The use of thermoplastic resins, such as, polyolefine and/or polyacrylate resins are preferred, in a preferred range of 1 to 20 wt %, especially preferred in a range of 1 to 10 wt % based on the total weight of the powder coating composition.

As component C) the powder coating composition of this invention contains 0 to 20 wt % of at least one pigment and/or filler and/or extender. The powder coating composition may contain transparent, color-imparting and/or special effect-imparting pigments and/or extenders. Suitable color-imparting pigments are any conventional coating pigments of an organic or inorganic nature. Examples of inorganic or organic color-imparting pigments are titanium dioxide, micronized titanium dioxide, carbon black, azopigments, and phthalocyanine pigments. Examples of special effect-imparting pigments are metal pigments, for example, made from aluminum, copper or other metals, interference pigments, such as, metal oxide coated metal pigments and coated mica. Examples of usable fillers and/or extenders are silicon dioxide, silicate, such as, aluminum silicate, barium sulfate, calcium carbonate, magnesium carbonate and double carbonates of them.

The powder coating composition according to the invention may contain as component D) the constituents and additives conventional in powder coating technology, such as, flow-control agents, flatting agents, catalysts, stabilizers. Compounds having anti-microbial activity may also be added to the powder coating compositions. The additives are used in a range of 0.01 to 10 wt %, preferred in a range of 0.1 to 5 wt % based on the total weight of the powder coating composition. As stabilizer the use of thermal and/or UV stabilizers is preferred.

As ingredient E), the powder coating composition according to the invention may contain 0 to 40 wt % of at least one adhesion promoter additive. Examples are resins and hydrogenated resins, hydrocarbons and hydrogenated hydrocarbons, such as, aliphatic and/or aromatic resins, pure monomer aromatic resins, hydrogenated pure monomers, chemically modified polyolefine waxes, maleic anhydride-grafted polyethylene or polypropylene resins, ethylene maleic anhydride copolymers, propylene maleic anhydride copolymers, propylene ethylene copolymers waxes.

The powder coating composition according to the invention may contain also cross-linkers to cross-link components A) and/or B). Examples of cross-linkers are peroxides, amines, alcohol phosphates as known at a person skilled in the art. The cross-linkers can be used in quantities in the range of, for example, 0 to 20 wt % based on the total weight of the powder coating composition.

The powder coating composition according to the invention may be prepared by conventional manufacturing techniques used in the powder coating industry. For example, the ingredients used in the powder coating composition, can be blended together and heated to a temperature to melt the mixture and then the mixture is extruded. The extruded material is then granulated and then ground to a fine powder, which can be classified to the desired grain size, for example, to an average particle size of 20 to 200 microns.

The powder coating composition of this invention may be applied by spraying, thermal or flame spraying, or fluidized bed coating methods, all of which are known to those skilled in the art.

The coating composition may be applied to the substrate surface as first coat or as coating layer in a multi-layer film build. Preferably the coating composition may be applied as first coating layer directly onto the substrate surface.

The applied powder coating compositions according to the invention can be coated with at least one coating layer, e.g., a top coat which can be each kind of top coats, e.g., a UV powder top coat or a liquid top coat.

In certain applications, the substrate to be coated may be pre-heated before the application of the powder, for example, in a range of 30 to 200° C., preferred, in a range of 100 to 140° C., dependent on the kind of the thermoplastic substrate. For example, gas is commonly used for various heating steps, but other methods, e.g., microwaves, IR or NIR are also known.

After application of the powder coating composition according to the invention on the thermoplastic composite it is post-heated at a temperature above the melting range of the coating composition, however, below the melting point of the thermoplastic composite, for example, in a temperature range of 80 to 220° C., dependent on the kind of the thermoplastic substrate. The post-heating may be done by gas or air heating, e.g., in an oven, and/or IR or NIR as known in the art, to finish the film forming on the substrate and to cure the film.

Dual curing methods are also possible if desired. Dual curing means a curing method where the applied composition can be cured both by high energy radiation and by thermal curing methods known by a skilled person. High energy radiation means UV (ultraviolet) radiation or electron beam radiation, carried out, for example, in a belt unit fitted with one or more UV-radiation emitters or with one or more UV-radiation emitters positioned in front of the object to be irradiated, or the area to be irradiated, or the substrate to be irradiated and/or the UV-radiation emitters are moved relative to one another during irradiation. The powder coating composition according to the invention may therefore contain photoinitiators in quantities of, e.g., 0.1 to 7 weight-%, relative to the total of resin solids and photoinitiators, for example, benzoin and derivatives, acetophenone and derivatives, hydroxyalkyl phenones and acyl phosphine oxides.

Substrates, which may be considered, are substrates consisting of thermoplastic composites made from thermoplastic fiber material. Such substrates may be, for example, commingled roving composed of fibers of polyolefine, for example, polyethylene and/or polypropylene, of thermoplastic polyesters and/or of polyamides. The thermoplastic composites may also be made from a mixture of such thermoplastic fiber material and glass fiber material. The rovings were easily converted into thermoplastic composites following various process, such as, filament winding, vacuum moulding, panel lamination, thermoforming stamping or diaphragm forming. Thermoplastic composites are used in the automotive, pipes, cylinders, bottles or containers industries. Substrates may also be plastic parts reinforced by such types of fibers, for example, automotive and industrial bodies or body parts.

The coating composition according to the invention is especially suitable for coating of thermoplastic composites based on thermoplastic fiber material and glass fiber material in a ratio in a range of 60:40 to 10:90. Preferred is a filament winding of polypropylene fibers and glass fibers, e.g., in a ratio of the polypropylene fibers and glass fibers of 30:70.

The present invention is further defined in the following Examples. It should be understood that these Examples are given by way of illustration only. From the above discussion and these Examples, one skilled in the art can ascertain the essential characteristics of this invention, and without departing from the spirit and scope thereof, can make various changes and modifications of the invention to adapt it to various uses and conditions. As a result, the present invention is not limited by the illustrative examples set forth herein below, but rather is defined by the claims contained herein below.

The following Examples illustrate the invention.

EXAMPLES

The amounts are in parts per weight.

Example 1

Manufacturing of a Powder Coating Composition According to the Invention and Application Formulation:

| | |
|---|---|
| Ethylene vinyl acetate (16-20 w % vinyl acetate, MFI: 130-170 g/10 min) | 90.3 |
| TiO$_2$ pigment | 6 |
| Polyacrylate | 2.8 |
| UV and thermal stabilizer | 0.6 |
| Flow agent | 0.3 |

MFI measured according to ASTM D 1238-ISO 1133

The components of the formulation are mixed together by dry-mixing and then by melt mixing using an extruder, at a temperature of 100 to 160° C. After cooling, the formulation is ground by micronisation, and sieved to particles having a particle size between 20 to 200 μm.

The resulted powder coating composition is applied to a thermoplastic cylinder built by filament winding of polypropylene fibers and glass fibers in a ratio of the polypropylene fibers and glass fibers of 1:3.

The thermoplastic cylinder is pre-heated to a temperature of 90 to 100° C. The powder is electrostatically applied onto the pre-heated cylinder by powder spray guns in one pass. The coated cylinder is postheated in an oven under temperatures in a range of 120 to 130° C.

Example 2

Testing of the Coatings

TABLE 1

| | Film thickness[1] | Adhesion to substrate[2] | Impact Resistance[3] |
|---|---|---|---|
| Formulation | 300-600 μm | 5B (0% area removed) | >10 [J] |

[1]Film Thickness: ASTM B 499
[2]Adhesion: ASTM D 3359
[3]Impact Resistance: ASTM D 2794

The method of delaminated coating thickness measurement covers the use of magnetic instruments for the nondestructive measurement of the thickness of nonmagnetic coatings (delaminated) over ferrous or other magnetic base metals. These instruments measure either the magnetic attraction between a magnet and the basis metal, as influenced by the presence of the coating, or the reluctance of a magnetic-flux path passing through the coating and the basis metal. As a result, the thickness of the thermoplastic powder coating according to the invention was measured in a range of 300-600 μm.

The equipment used for measuring adhesion is a cutting tool, a cutting guide, a rule, a tape and a magnifying glass. Clean and dry specimens are required for this test. The steps are as follows: Select an area free of blemishes and minor surface imperfections. Make 6 cuts about 20 mm long and space the cuts 2 mm apart by cutting through the film to the substrate in one steady motion. Brush the area, place the center of the tape over the grid and, within 90±30 sec, remove the tape by seizing the free end of the tape to an angle as close to 180°. Inspect the grid area and rate the adhesion in accordance with the scale illustrated in the standard. As a result, an adhesion rate of 5 B was achieved, i.e., 0% of area of the coating was removed.

The equipment used for impact testing is an Erichsen drop-weight impact tester conforming to the general description outlined in ASTM D 2794. Test specimens are conditioned for 24 hours at 23° C. Impact testing is carried out using the procedure detailed in the standard. Examination of the impacted area was made using a Nikon microscope with 20× magnification. As a test result, failure on the impact side did not occur on the thermoplastic composite specimen coated with the thermoplastic powder coating composition according to the invention tested with an impact force of 10 J.

What is claimed is:

1. An article of manufacture which comprises a substrate consisting of a thermoplastic composite fiber material comprising a mixture of thermoplastic fibers and glass fiber materials said substrate having a powder coating adhered to at least one surface thereof, said powder coating consisting essentially of an intimate mixture of:

A) 50 to 99 wt % of at least one ethylene-vinyl acetate copolymer with a vinyl acetate content in the range of 16 to 20 wt % based on the wt of copolymer, B) 1 to 50 wt % of a thermoplastic binder resin, a thermosetting binder resin or a combination thereof, and C) 0 to 20 wt % of a pigment, a filler or a mixture thereof, wherein the wt % amounts are based on the total weight of the powder coating.

2. The article of manufacture according to claim 1 wherein the powder coating is an intimate mixture of A) 80 to 99 wt % of at least one ethylene-vinyl acetate copolymer with a vinyl acetate content in the range of 16 to 20 wt % based on the wt of copolymer, B) 1 to 20 wt % of a thermoplastic binder resin, a thermosetting binder resin or a combination thereof, C) 0 to 10 wt % of a pigment, a filler or mixtures thereof, and D) 0.1 to 10 wt % of at least one additive conventionally used in coating technology, wherein the wt. % amounts are based on the total weight of the powder coating.

3. The article of manufacture according to claim 1 wherein the ethylene-vinyl acetate copolymer of component A) in the powder coating has a melt flow index in a range of 120 to 180 g/10 min as measured according to test method ASTM D 1238-ISO 1133.

4. The article of manufacture according to claim 1 wherein the component B) is a thermoplastic binder resin.

5. The article of manufacture according to claim 4 wherein the thermoplastic binder resin in the powder coating is a polyolefin resin or a polyacrylate resin with a content of thermoplastic binder resin of 1 to 10 wt % based on the total weight of the powder coating.

* * * * *